June 9, 1964 H. D. AUSFRESSER 3,136,960
PULSE WIDTH MODULATOR
Filed April 3, 1958 2 Sheets-Sheet 1

WITNESSES:
Bernard R. Gieguez
James F. Young

INVENTOR
Harold D. Ausfresser
BY Maury I. Hull
ATTORNEY

United States Patent Office 3,136,960

Patented June 9, 1964

3,136,960
PULSE WIDTH MODULATOR

Harold D. Ausfresser, Baltimore, Md., assignor to Westinghouse Electric Corporation, East Pittsburgh, Pa., a corporation of Pennsylvania Filed Apr. 3, 1958, Ser. No. 726,128
2 Claims. (Cl. 332—12)

This invention relates to improvements in pulse width modulators, and more particularly to modulators for producing a pulse width which is proportional to the amplitude of a control voltage, and which employs a saturable magnetic core member to achieve pulse width modulation.

This invention is an improvement upon the apparatus described and claimed in Patent No. 2,780,782 entitled Pulse Width Modulator, issued February 5, 1957, to Richard L Bright and assigned to the assignee of the instant invention.

In that patent there is described a pulse width modulator including a saturable magnetic core member having three windings thereon, a source of direct current control voltage and a first junction transistor connected in series with one of the windings, a source of direct current and a second junction transistor connected in series with the second of the windings, a square-wave generator operatively connected to both of the transistors for rendering the transistors alternately conductive, and means including a rectifier connected to the third winding for obtaining output pulses from the third winding. In the operation of the modulator circuit just described, the direct current control voltage controls the saturation time of the saturable magnetic core and thereby controls the width of the output pulses.

The above-described prior art pulse width modulator, however, has several disadvantages. For example, the prior art modulator reqiures a resistor in series with one of the transistors to limit current flow after the magnetic core has saturated, but this resistor is in series with the shunt winding capacitance, and thus prevents rapid charging with a resulting slow rise and fall time. The fall time in the prior art apparatus is further limited by the rounding off of the hysteresis curve of the saturable magnetic core material just before saturation is reached, and also by the voltage drop produced in the aforementioned resistor. Another disadvantage is the high current which flows through one of the transistors after saturation of the core has occurred, this high current lasting until the beginning of the reset cycle.

In the preferred embodiment of the instant invention, these and other disadvantages of the prior art are overcome by providing an additional or fourth winding on the saturable magnetic core, and applying the induced voltage in the fourth winding to the transistor in the reset portion of the circuit to control the conductivity of that transistor and accordingly control the application of the reset voltage, which restores the magnetic core to saturation. In other embodiments of the instant invention, induced voltages are also utilized to control transistor conductivity during the reset portion of the cycle of operation.

Accordingly, a primary object of the instant invention is to provide a new and improved pulse width modulator employing a saturable magnetic core member.

Another object is to provide a new and improved pulse width modulator employing a saturable magnetic core member in which a fast rise time and a fast fall time may be obtained.

A further object is to provide a new and improved pulse width modulator of the above-described type in which current flow at any time in the operation of the apparatus is limited to a reasonable value.

Other objects and advantages will become apparent after a study of the following specification when read in connection with the accompanying drawings, in which.

Figure 1:
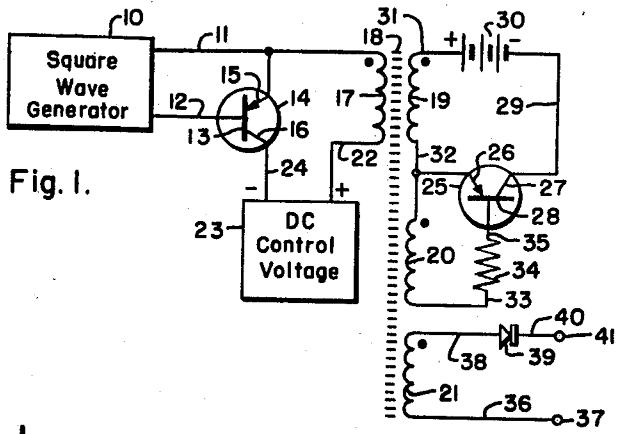
FIGURE 1 is an electrical circuit diagram of the invention according to the preferred embodiment thereof.

In FIG. 1, to which particular attention is directed, there is shown at 10, in block form, a square wave generator of any convenient design applying output to leads 11 and 12, lead 12 being connected as shown to the base 13 of a PNP transistor 14 having in addition to the base 13 an emitter 15 and a collector 16. Emitter 15 is connected to lead 11, which is also connected to one terminal of a winding 17 on a saturable magnetic core 18, the core 18 also having thereon windings 19, 20 and 21 for reasons which will become hereinafter more clearly apparent. The other terminal of the aforementioned winding 17 is connected by way of lead 22 to a source of direct current control voltage shown in block form and designated 23, it being understood that the amplitude of the control voltage from source 23 may be varied at will by the user of the apparatus to change the width of the pulse output of the modulator. The control voltage source 23 is also connected by lead 24 to the aforementioned collector 16 of transistor 14, the output voltage being developed between leads 22 and 24.

A second PNP transistor is provided as shown, designated 25 and having emitter 26, collector 27 and base 28. The collector 27 is connected by way of lead 29, battery 30 and lead 31 to one terminal of the aforementioned winding 19, whereas the emitter 26 is connected by way of lead 32 to the other terminal of the winding 19. Lead 32 is also connected to one terminal of the aforementioned winding 20 whereas the other terminal of the winding 20 is connected by way of lead 33, resistor 34 and lead 35 to the aforementioned base 28 of transistor 25.

As aforementioned, a fourth winding is provided on the saturable magnetic core 18 and is designated 21, one terminal of winding 21 being connected by way of lead 36 to one output terminal 37, the other terminal of winding 21 being connected by way of lead 38, rectifier 39 and lead 40 to another output terminal 41, it being understood that the useful output of the apparatus is developed between the output terminals 37 and 41.

Figure 3:
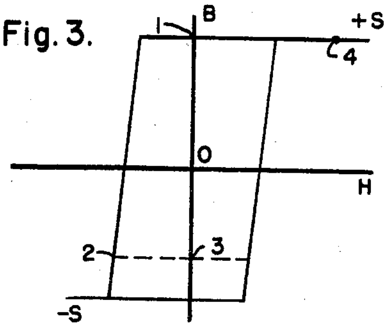

In the operation of the apparatus of FIG. 1 an understanding can most readily be obtained by noting that the core 18 is preferably formed from rectangular hysteresis loop material, such, for example, as Hypernik V. The hysteresis curve for this type of the material is shown in FIG. 3 to be characterized by a sharp cutoff point between conditions of saturation, that is, constant B as H increases, where B is the flux density measured in webers per square unit of area and H is the field intensity measured in ampere turns per unit of length and, on the other hand, conditions of unsaturation. There are two regions of saturation which may be designated +S and —S. The core 18 saturates in the +S region when its flux density reaches a certain level in one direction, which may be referred to as the positive direction, and in a similar manner the core 18 saturates in the —S region when its flux density reaches a certain level in the other direction, which will be called the negative direction. In accordance with well-known magnetic theory, each of the windings 17, 19, 20 and 21 presents a much lower impedance while the core 18 is saturated than while it is unsaturated. Windings 17, 19 and 20 are wound on core 18 in a predetermined manner so that the induced voltages appearing across these windings will have the same relative polarities, the points of like instantaneous polarity being indicated on the drawing of FIG. 1 by dots. The direction of winding of output winding 21 is also predetermined.

The transistor 14 is of the P–N–P type as shown and aforementioned, and when the upper lead 11 of the square-wave generator 10 is positive with respect to the lower lead 12, a relatively large current flows through the transistor 14. The output of the square-wave generator 10 accordingly controls the operation of transistor 14; when the square-wave has one polarity, the transistor 14 will conduct and when the square-wave has the opposite polarity, the transistor 14 will not conduct in any substantial amount. In this manner, the transistor 14 acts as a switch to control the application of the voltage from D.-C. control voltage source 23 to the winding 17.

The basic principles of magnetic circuits underlying the operation of the apparatus of the instant invention are set forth in some detail in the prior art Patent No. 2,780,782 hereinbefore referred to, and reference may be had to this patent for a more detailed understanding of these principles. Suffice it to state here, variations in the value of control voltage from source 23 applied to winding 17 vary the saturation time of core 18, and also vary the positions of the operating points on the hysteresis curve of FIG. 3, in a manner which will become hereinafter more clearly apparent.

Assume by way of description that while the apparatus is turned off the core 18 is in a condition of positive saturation corresponding to point 1, FIG. 3. This may be a stable condition at which the core may remain for an extended period of time. Assume also that no current is flowing in any winding coupled to the core when the square-wave generator 10 is turned on, and that initially or during the first half cycle lead 11 is positive with respect to lead 12, causing transistor 14 to start conducting, and remain conducting while a positive potential is applied to the emitter 15 from square-wave generator 10. With transistor 14 conducting, a D.-C. voltage from source 23 now appears across winding 17. During the time the voltage is applied to winding 17, induced voltages appear in windings 19 and 20, the dots indicating terminals of instantaneous negative polarity. It will be noted that the rectifier 39 prevents an output from winding 21 during this portion of the cycle of operation.

As will be more fully apparent hereinafter, one of the conditions of operation of the apparatus is that the time duration of the wave from source 10, the value of the control voltage from source 23, and the inductance of winding 17, or more specifically flux change represented by $$\frac{k}{N}edt$$

are so selected with respect to each other that the core 18 is never driven to negative saturation, so that a steady state current never exists in winding 17. It should also be noted that the voltage polarity in winding 20 is such as to prevent conduction in transistor 25, the value of the induced voltage in winding 20 being more than sufficient to prevent current flow in the transistor 25 resulting from the added potentials of battery 30 and the instantaneous voltage or potential induced in winding 19.

During this interval while the voltage from source 23 is applied to winding 17, the flux in the core 18 changes in a manner to drive core 18 toward negative saturation, but the positive half cycle from source 10 stops before negative saturation is reached, stopping the flux change in the core at, for example, point 2 on the B–H curve, FIG. 3.

As transistor 14 is turned off by the action of the square-wave at the end of the first-half cycle, the current in winding 17 falls to zero, and the flux changes from point 2 to point 3 at the $H=0$ axis of the hysteresis curve, FIG. 3. This last-named flux change causes induced voltages to appear across the windings including a voltage across winding 20 in a direction to cause transistor 25 to start conducting. Once transistor 25 starts conducting, a reset voltage from source 30 is applied to winding 19 and this last-named voltage causes a further induced voltage in winding 20 which maintains transistor 25 conducting. Switching occurs with great rapidity because the action is regenerative and also because there is no resistor in series with battery 30 to limit the capacitive charging current in the circuit consisting of the transistor 25, battery 30 and winding 19, as there is in the prior art circuit mentioned heretofore.

Figure 4:
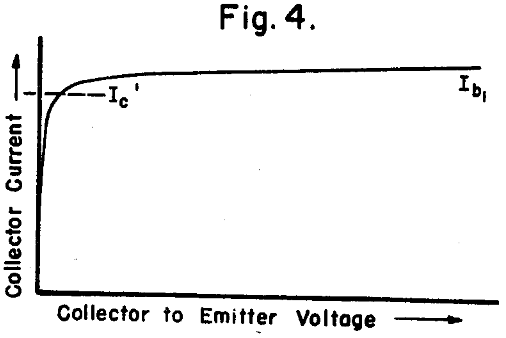

The voltage across winding 20 will be substantially constant so long as transistor 25 is fully conducting. Thus, the base current $I_{b_1}$, FIG. 4, into the transistor 25 and more specifically base 28 is substantially constant. The voltage across winding 19 causes a flux change in core 18 which brings core 18 back to positive saturation. After the core 18 reaches positive saturation, the collector current $I_c$ of transistor 25 increases further and more rapidly until it attains a predetermined value $I_c'$ as shown in FIG. 4. This current $I_c'$ corresponds to the value of field strength represented by point 4, FIG. 3, which is the aforementioned current in series with source 30. At the time the $I_c$ current reaches the predetermined value corresponding to $I_c'$, an unstable condition is reached where the transistor 25 would be called on or required to conduct more collector current than the amount $I_c'$. This, however, is impossible. The voltage across the collector to emitter of transistor 25 thus increases, as illustrated by FIG. 4, and thereby reduces the voltage across winding 19 and hence across winding 20. This in turn reduces the base current, and further increases collector to emitter voltage, etc. The current in transistor 25 falls to zero, and the flux in core 18 returns to point 1, FIG. 3. This flux change produces the transient shown at "*a*" in FIG. 2. It is seen that the switching action is regenerative, and occurs very rapidly.

Figure 2:
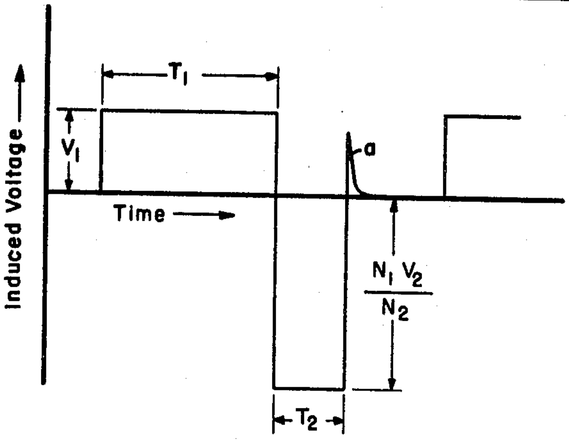
FIGS. 2, 3 and 4 are graphs illustrating the operation of the apparatus of FIG. 1.

The curve of FIG. 2 represents the wave form of the pulses and voltages in the circuit of FIG. 1, as observed across winding 17, it being understood that the output voltage is a pulse of variable width or duration obtained in winding 21 and applied by circuit means including rectifier 39 to the aforementioned output terminals 41 and 37.

Assuming winding 17 has $N_1$ turns and winding 19 has $N_2$ turns, then, approximately $$T_2=\frac{N_2T_1}{N_1V_2}V_1$$

where $V_1$ is the D.-C. control voltage from source 23, $T_1$ is the time duration of the positive half cycle of the square-wave from generator 10, $V_2$ is the amplitude of the reset voltage 30, and $T_2$ is the time duration of the reset voltage, which is substantially the time duration of the output pulse. Since $$\frac{N_2T_1}{N_1V_2}$$

may be made constant, the width $T_2$ of the output pulse is substantially proportional to the value of $V_1$.

It will be seen, then, that the apparatus of the instant invention accomplishes the aforenamed objectives. The reset transistor 25 is not required to handle large saturation currents, and the efficiency of the apparatus is thereby improved.

By suitable design, as will be readily understood by those skilled in the art, a range of pulse widths of 200 to 1 may be easily obtained.

It will be understood that instead of using three windings to generate the pulse of controlled width as shown in FIG. 1 that one tapped winding could be employed since, as appears from a study of the circuit of FIG. 1, the various polarities at different points in the circuit are such as to make apparatus employing a single tapped winding feasible.

The transient "*a*" of FIG. 2 as well as the pulse signal in the first half cycle of operation is eliminated in the output circuit by rectifier 39, FIG. 1.

Whereas transistor of the P–N–P type have been shown and described, it should be understood that N–P–N type transistors could be employed if desired, or a combination of the two types, suitable revision of the circuit and polarities being made in a manner which will be apparent to one skilled in the art.

Whereas source 10 has been described as providing a square-wave output, it should be understood that the output of generator 10 may occur at irregular or random intervals, so long as the output contains a positive pulse followed substantially immediately by a negative pulse, or a biased circuit containing a one-shot multivibrator could be employed for source 10.

Figure 5:
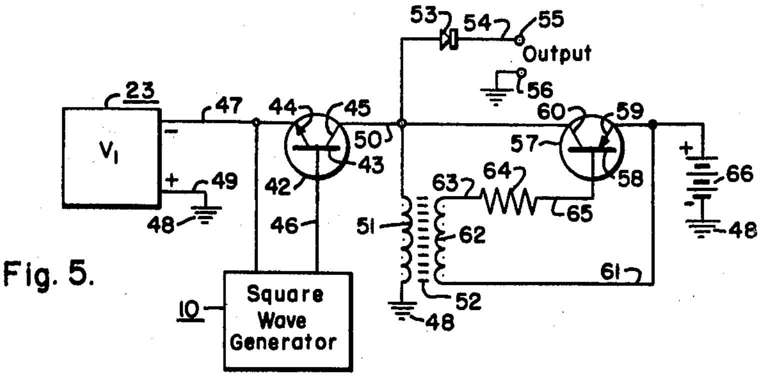
FIG. 5 is a schematic circuit diagram of a second embodiment of the invention.

Particular reference should be made now to FIG. 5 in which a second embodiment of the invention is shown in schematic form. A transistor 42 of the N–P–N type is provided having a base 43, emitter 44 and collector 45. The base 43 is connected by lead 46 to one terminal of a square-wave generator or other source 10 whereas the other terminal of the square-wave generator 10 is connected by lead 47 to the aforementioned emitter 44, which emitter is also connected to receive the output of the aforementioned variable direct current control voltage source 23, lead 47 being connected to the negative terminal thereof, the positive terminal of source 23 being connected to ground 48 by way of lead 49. The aforementioned collector 45 is connected by way of lead 50 to one terminal of a winding 51 coupled to or wound on a saturable magnetic core 52, the other terminal of winding 51 being connected to ground 48. Lead 50 is also connected by way of rectifier 53 and lead 54 to an output terminal 55, the other output terminal 56 being connected to ground 48.

A second transistor of the P–N–P type is provided and designated 57 having a base 58, emitter 59 and collector 60. The collector 60 is connected to the aforementioned lead 50. The emitter 59 is connected by way of lead 61 to one terminal of a second winding 62 on the aforementioned saturable magnetic core 52, the other terminal of the winding 62 being connected by way of lead 63, resistor 64 and lead 65 to the aforementioned base 58. The aforementioned lead 61 is also connected to the positive terminal of a battery or other source of direct current potential 66 which has the other or negative terminal thereof connected to ground 48.

The operation of the apparatus of FIG. 5 is similar to the operation of the apparatus of FIG. 1 described in detail heretofore, the battery 66 supplying a reset voltage by way of transistor 57 which is applied across winding 51 and thereby alters the flux in the saturable magnetic core 52 and returns the core to saturation. Induced voltages in the winding 62 applied between the base 58 and emitter 59 of transistor 57 control the conductivity of the transistor 57. The aforementioned rectifier 53 insures that the output pulses across output terminals 55 and 56 are of uniform polarity and that transients are eliminated in the output of the apparatus.

Figure 6:
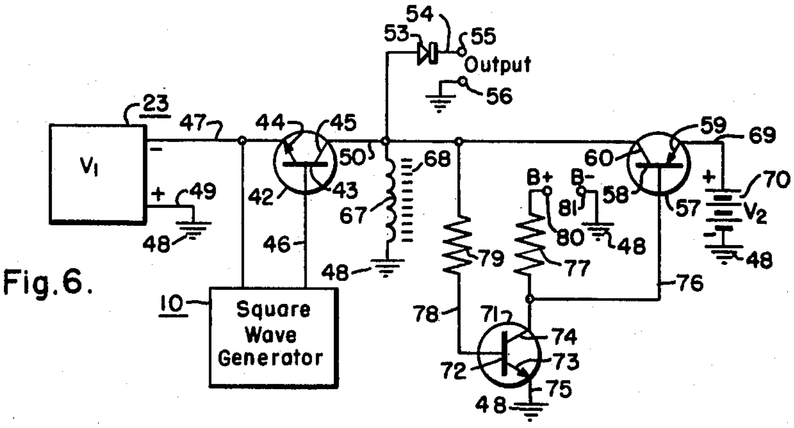
FIG. 6 is a circuit diagram of a third embodiment of the invention.

Particular reference should be made now to FIG. 6 in which a third embodiment of the invention is shown. The aforementioned transistor 42 is utilized in the circuit of FIG. 6 in a manner similar to its utilization in the circuit of FIG. 5, the variable direct current control voltage source 23 and the square-wave generator 10 being connected to transistor 42 in a similar manner, and the collector 45 of transistor 42 is as aforedescribed connected by way of lead 50 to the collector 60 of the second transistor 57. A single winding 67 is provided on a saturable magnetic core 68, the winding 67 having one terminal thereof connected to lead 50 and the other terminal thereof connected to ground 48. The aforementioned emitter 59 of transistor 57 is connected by way of lead 69 to the positive terminal of a battery 70 supplying a reset voltage corresponding to $V_2$, the negative terminal of battery 70 being connected to ground 48.

In the embodiment of FIG. 6, a third transistor of the N-P-N type is employed and is designated 71, having a base 72, emitter 73 and collector 74, the emitter 73 being connected by way of lead 75 to ground 48, the collector 74 being connected by way of lead 76 to one terminal of a resistor 77 which has the other terminal thereof connected to the positive terminal 80 of a suitable source of direct current potential, not shown, the last-named source of direct current potential having the negative terminal 81 thereof connected to ground 48. Lead 76 is also connected to the aforementioned base 58 of transistor 57. The aforementioned base 72 of transistor 71 is connected by way of lead 78 and resistor 79 to the aforementioned lead 50 and thence to the collector 60 of transistor 57.

The operation of the apparatus of FIG. 6 is similar to the operation of the apparatus of FIG. 1 and will be readily understood in connection with the detailed explanation provided hereinbefore of the apparatus of FIG. 1. The apparatus of FIG. 6 differs primarily in the means for controlling the conduction of the transistor 57. At the end of the period of conduction of transistor 42, a transient is produced across the winding 67 which momentarily causes transistor 71 to conduct. This transient is caused by the flux change from that at point 2 on the hysteresis curve of FIG. 3 to point 3 on the hysteresis curve of FIG. 3. The momentary conduction by transistor 71 causes transistor 57 to also start conduction. However, conduction by transistor 57 causes voltage $V_2$ from battery 70 to be impressed across the winding 67 and maintains the transistor 71 conducting which, in turn, maintains the transistor 57 conducting. This regenerative process is repeated, but in reverse when point 4 of FIG. 3 is reached. At this time transistor 57 cannot supply more current than $I_c'$ and therefore the collector-to-emitter voltage increases, decreasing the base current in the transistor 71. This reduces the base current in the transistor 57, further increasing the collector-to-emitter voltage across transistor 57, and so forth. The +B voltage across terminals 80 and 81 must be greater in amplitude than the voltage $V_2$ supplied by battery 70 of FIG. 6 if proper operation is to be obtained.

The phrase "on said core" as used in the claims appended hereto means inductively coupled to the core in any desired manner.

Whereast the invention has been shown and described with respect to several embodiments thereof which give satisfactory results, it should be understood that changes may be made and equivalents substituted without departing from the spirit and scope of the invention.

I claim as my invention:

1. A pulse width modulator comprising, in combination, a saturable magnetic core member having a preselected substantially rectangular B-H characteristic curve and having first, second, third and fourth windings thereon, all said windings being wound in predetermined directions and having preselected numbers of turns, means operatively connected to said first winding for applying a first direct current voltage of predetermined amplitude to the first winding for a predetermined period of time and then abruptly stopping the application of said first voltage, said first voltage while applied to the first winding changing the flux in said core member in a manner which tends to change the core member toward saturation in a first direction on said B-H characteristic curve, said first voltage stopping before the core member reaches saturation in said first direction, the stopping of said first voltage causing a further change in the flux in said core member, said further flux change causing an induced voltage in said second winding, a source of a second direct current voltage, circuit means operatively connecting said second direct current voltage source to said third winding, said circuit means including a transistor operatively connected to the second winding and having the conductivity thereof under the control of the induced voltage in the second winding for while conductive causing the application of the second direct current voltage to the third winding, said second direct current voltage while applied to said third winding causing a still further change in the flux in said core member in a manner which causes the core member to become saturated in a second direction on said B-H characteristic curve opposite to said first direction and induces a voltage in said second winding which causes said transistor to stop the application of the second voltage to the third winding, all the flux changes in said core member causing induced voltages in said fourth winding, and output circuit means connected to the fourth winding and including rectifier means for limiting the output to pulses of a single selected polarity.

2. A pulse width modulator comprising, in combination, a saturable magnetic core member having a preselected substantially rectangular B-H characteristic curve and having first, second, third and fourth windings thereon, all said windings being wound in predetermined directions and having preselected numbers of turns, a first source of a direct current voltage, circuit means including a first transistor operatively connecting said first direct current voltage source to said first winding, pulse generator means operatively connected to said first transistor, said first transistor being rendered conductive for a predetermined period of time by the pulses from the pulse generator and while conductive applying said first direct current voltage to said first winding, said first voltage while applied to the first winding changing the flux in said core member in a manner which tends to change the core member toward saturation in a first direction on said B-H characteristic curve, said first transistor stopping the application of the first voltage before the core member reaches saturation in said first direction, the stopping of said first voltage causing a further change in the flux in said core member, said further flux change causing an induced voltage in said second winding, a source of a second direct current voltage, other circuit means operatively connecting said second direct current voltage source to said third winding, said other circuit means including a second transistor operatively connected to the second winding and having the conductivity thereof under the control of the induced voltage in the second winding for causing the application of the second direct current voltage to the third winding while said second transistor is conductive, said second direct current voltage while applied to said third winding causing a still further change in the flux in said core member in a manner which causes the core member to become saturated in a second direction on said B-H characteristic curve opposite to said first direction and induces a voltage in said second winding which causes said second transistor to become non-conductive and stop the application of the second direct current voltage to the third winding, all of the flux changes in said core member causing induced voltages in said fourth winding, and output circuit means connected to the fourth winding and including rectifier means for limiting the output to pulses of a single preselected polarity.

References Cited in the file of this patent

UNITED STATES PATENTS

| | | |
|---|---|---|
| 2,424,977 | Grieg | Aug. 5, 1947 |
| 2,780,782 | Bright | Feb. 5, 1957 |
| 2,875,412 | Kaplan | Feb. 24, 1959 |

OTHER REFERENCES

Pub. I: Transistors as On-Off Switches in Saturable-Core Circuits by Bright et al., Electrical Manufacturing, December 1954, page 81.